United States Patent
Wifvesson et al.

(10) Patent No.: US 10,555,177 B2
(45) Date of Patent: Feb. 4, 2020

(54) METHOD OF OPERATION OF A TERMINAL DEVICE IN A CELLULAR COMMUNICATIONS NETWORK

(71) Applicant: TELEFONAKTIEBOLAGET LM ERICSSON (PUBL), Stockholm (SE)

(72) Inventors: Monica Wifvesson, Lund (SE); Noamen Ben Henda, Stockholm (SE); Magnus Karlsson, Lund (SE); Vesa Lehtovirta, Jorvas (FI); Katharina Pfeffer, Stockholm (SE); Vesa Torvinen, Turku (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/765,839

(22) PCT Filed: Oct. 4, 2016

(86) PCT No.: PCT/EP2016/073681
§ 371 (c)(1),
(2) Date: Apr. 4, 2018

(87) PCT Pub. No.: WO2017/060245
PCT Pub. Date: Apr. 13, 2017

(65) Prior Publication Data
US 2019/0116499 A1     Apr. 18, 2019

Related U.S. Application Data

(60) Provisional application No. 62/237,065, filed on Oct. 5, 2015.

(51) Int. Cl.
*H04W 12/10* (2009.01)
*H04L 29/06* (2006.01)
(Continued)

(52) U.S. Cl.
CPC ......... *H04W 12/1008* (2019.01); *H04L 63/12* (2013.01); *H04L 63/205* (2013.01);
(Continued)

(58) Field of Classification Search
CPC ........... H04L 63/12; H04L 9/32; H04L 29/06; H04W 12/10; H04W 76/10
See application file for complete search history.

(56) References Cited

U.S. PATENT DOCUMENTS 7,246,242 B1   7/2007  Niemi et al.
8,656,169 B2   2/2014  He
(Continued)

FOREIGN PATENT DOCUMENTS

EP    1753183 A2     2/2007
JP    2004-222313 A  8/2004
(Continued)

OTHER PUBLICATIONS

International Search Report and Written Opinion issued in Application No. PCT/EP2016/073681 dated Dec. 20, 2016, 9 pages.
(Continued)

*Primary Examiner* — Mewale A Ambaye
(74) *Attorney, Agent, or Firm* — Rothwell, Figg, Ernst & Manbeck, P.C.

(57) ABSTRACT

A method of operation of a terminal device in a cellular communications network is disclosed. The method comprises sending a GMM Attach Request message to the network, the GMM Attach Request message identifying security capabilities of the terminal device. The terminal device receiving from the network an echo message in the GMM layer including information identifying the security capabilities of the terminal device, wherein the echo message is received with integrity protection.

24 Claims, 7 Drawing Sheets

(51) Int. Cl.
*H04W 76/12* (2018.01)
*H04W 12/04* (2009.01)
*H04W 12/12* (2009.01)

(52) U.S. Cl.
CPC . *H04W 12/0401* (2019.01); *H04W 12/04031* (2019.01); *H04W 12/1201* (2019.01); *H04W 76/12* (2018.02)

(56) References Cited

U.S. PATENT DOCUMENTS

| | | | |
|---|---|---|---|
| 9,197,669 B2 | 11/2015 | Escott et al. | |
| 2003/0033518 A1* | 2/2003 | Faccin | H04L 63/04 713/153 |
| 2006/0288204 A1 | 12/2006 | Sood et al. | |
| 2007/0072635 A1* | 3/2007 | Zhao | H04W 12/10 455/502 |
| 2008/0205650 A1* | 8/2008 | Forsberg | H04L 63/205 380/272 |
| 2010/0115275 A1 | 5/2010 | Suh et al. | |
| 2011/0312299 A1 | 12/2011 | Patil et al. | |
| 2013/0097692 A1* | 4/2013 | Cooper | G06F 21/00 726/14 |
| 2013/0188515 A1* | 7/2013 | Pinheiro | H04L 67/16 370/254 |
| 2014/0269613 A1 | 9/2014 | Tiwari et al. | |
| 2015/0163703 A1* | 6/2015 | Wu | H04W 36/0022 370/331 |
| 2018/0083972 A1* | 3/2018 | Kim | H04L 63/205 |
| 2018/0324594 A1* | 11/2018 | Chen | H04L 9/3242 |

FOREIGN PATENT DOCUMENTS

| | | |
|---|---|---|
| JP | 2010-533390 A | 10/2010 |
| JP | 2013-524741 A | 6/2013 |
| RU | 2541110 C2 | 2/2015 |

OTHER PUBLICATIONS

3GPP, 3rd Generation Partnership Project; Technical Specification Group Core Network and Terminals; Mobile Station—Serving GPRS Support Node (MS-SGSN); Logical Link Control (LLC) layer specification (Release 11), 3GPP TS 44.064, V11.0.0, Jun. 2012, 64 pages.

3GPP, 3rd Generation Partnership Project; Technical Specification Group Core Network and Terminals; Mobile radio interface Layer 3 specification; Core network protocols; Stage 3 (Release 12), 3GPP TS 24.008, V12.2.0, Jun. 2013, 682 pages.

3GPP, 3rd Generation Partnership Project; Technical Specification Group Services and System Aspects; Study on EGPRS Access Security Enhancements with relation to cellular IoT (Release 13), 3GPP TR 33.860, V0.3.0, Aug. 2015, 22 pages.

English translation of Japanese Office Action issued in Japanese Application No. 2018-517258, dated Apr. 16, 2019, 2 pages.

Russian Search Report issued in Application No. 2018116571/08 dated Feb. 28, 2019, with English Translation, 4 pages.

* cited by examiner

Figure 12

METHOD OF OPERATION OF A TERMINAL DEVICE IN A CELLULAR COMMUNICATIONS NETWORK

CROSS REFERENCE TO RELATED APPLICATION

This application is a 35 U.S.C. § 371 National Stage of International Application No. PCT/EP2016/073681, filed Oct. 4, 2016, designating the United States and claiming priority to U.S. provisional application No. 62/237065, filed on Oct. 5, 2015. The above identified applications are incorporated by reference.

TECHNICAL FIELD

This invention relates to a method of operation of a terminal device in a cellular communications network, a method of operation of a network node, and corresponding terminal device and network node.

BACKGROUND

The Cellular Internet of Things (CIoT) is a new radio technology that is able to provide extended coverage for harsh environments, for example, basements, and is designed to serve massive number of UEs (over 50,000 per base station) using a very limited bandwidth (e.g. 160 bps).

The current assumption in 3GPP standardization is that the security mechanism for CIoT over GSM EDGE Radio Access Network (GERAN) would be based on enhancements of General Packet Radio Service (GPRS) security as introducing integrity protection for the control plane in Gb mode between the CIoT user equipment and the Serving GPRS Support Node (SGSN).

The assumption for CIoT is that the Universal Mobile Telecommunications System (UMTS) Authentication and Key Agreement (AKA) is run at the GPRS Mobility Management and Session Management (GMM/SM) layer creating the keying material, and the integrity protection is done at the Logical Link Control (LLC) layer using the integrity key (IK') created with the key derivation function from the UMTS AKA session keys.

SUMMARY

According to the present invention there is provided a method of operation of a terminal device in a cellular communications network. The method comprises: sending a GMM Attach Request message to the network, the GMM Attach Request message identifying security capabilities of the terminal device; receiving from the network an echo message in the GMM layer including information identifying the security capabilities of the terminal device, wherein the echo message is received with integrity protection.

In one embodiment, integrity protection is provided by a Message Authentication Code in the echo message.

In another embodiment, the echo message is a GMM Authentication and Ciphering Response message.

In a further embodiment, the security capabilities identified in the GMM Attach Request message include at least one of: an integrity protection algorithm supported by the terminal device; and an encryption algorithm supported by the terminal device.

According to the present invention there is provided a terminal device for use in a cellular communications network. The terminal device is adapted for: sending a GMM Attach Request message to the network, the GMM Attach Request message identifying security capabilities of the terminal device; and receiving from the network an echo message in the GMM layer including information identifying the security capabilities of the terminal device, wherein the echo message is received with integrity protection.

In one embodiment, the integrity protection is provided by a Message Authentication Code in the echo message.

In another embodiment, the echo message is a GMM Authentication and Ciphering Response message.

In a further embodiment, the security capabilities identified in the GMM Attach Request message include at least one of: an integrity protection algorithm supported by the terminal device; and an encryption algorithm supported by the terminal device.

According to the present invention there is provided a method of operation of a network node in a cellular communications network, the method comprising: receiving a GMM Attach Request message from a terminal device, the GMM Attach Request message identifying security capabilities of the terminal device; and transmitting to the terminal device an echo message in the GMM layer. The echo message includes information identifying the security capabilities of the terminal device, corresponding to the security capabilities identified in the GMM Attach Request message, and the method further comprises transmitting the echo message with integrity protection.

In one embodiment, the integrity protection is provided by a Message Authentication Code in the echo message.

In another embodiment, the echo message is a GMM Authentication and Ciphering Response message.

In a further embodiment, the security capabilities identified in the GMM Attach Request message include at least one of: an integrity protection algorithm supported by the terminal device; and an encryption algorithm supported by the terminal device.

According to the present invention there is provided a network node for use in a cellular communications network, being adapted for: receiving a GMM Attach Request message from a terminal device, the GMM Attach Request message identifying security capabilities of the terminal device; and transmitting to the terminal device an echo message in the GMM layer. The echo message includes information identifying the security capabilities of the terminal device, corresponding to the security capabilities identified in the GMM Attach Request message, and the network node is further adapted for transmitting the echo message with integrity protection.

In one embodiment, the integrity protection is provided by a Message Authentication Code in the echo message.

In another embodiment, the echo message is a GMM Authentication and Ciphering Response message.

In a further embodiment, the security capabilities identified in the GMM Attach Request message include at least one of: an integrity protection algorithm supported by the terminal device; and an encryption algorithm supported by the terminal device.

According to the present invention there is provided a computer program product, comprising a possibly tangible medium containing instructions for causing a processor to perform a method according to any of the appended claim 1-20 or 41-54

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Figure 1:
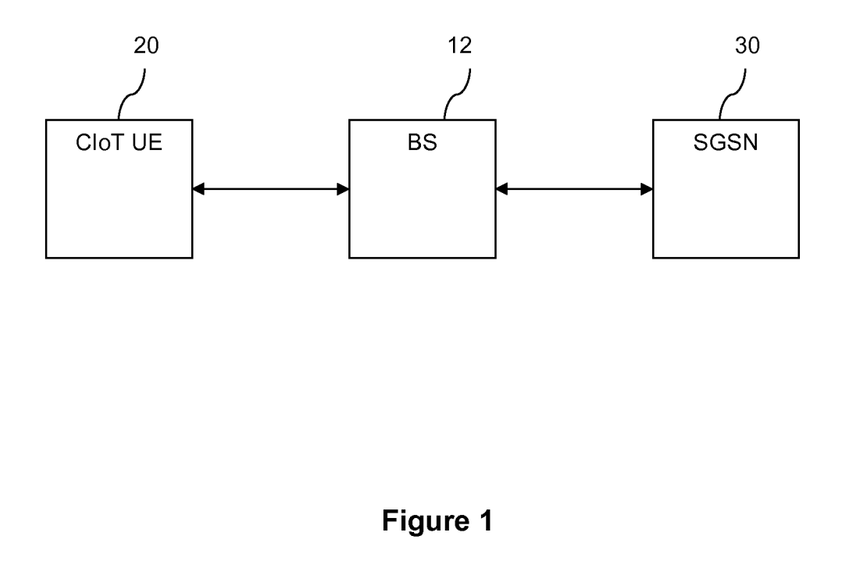
FIG. 1 illustrates a part of a cellular communications network.

FIG. 1 illustrates a part of a network 10. The network 10 comprises a basestation 12 connected to a Cellular Internet of Things (CIoT) terminal device (UE) 20 and a Serving GPRS Support Node (SGSN) 30. Of course, a network will typically include many basestations, and a very large number of terminal devices, but the present FIG. 1 is sufficient for an understanding of the present invention. The terminal device may be a user equipment device or may be a device that connects automatically to the network as required, and may be fixed or portable.

Figure 2:
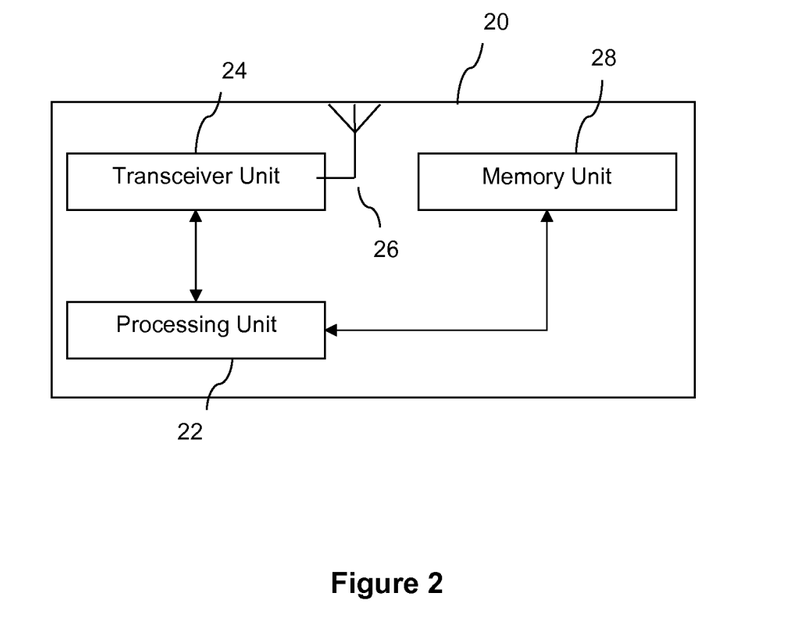
FIG. 2 illustrates a terminal device in the network of FIG. 1.

FIG. 2 shows a terminal device (UE) 20 that can be adapted or configured to operate according to one or more of the non-limiting example embodiments described. The UE 20 comprises a processor or processing unit 22 that controls the operation of the UE 20. The processing unit 22 is connected to a transceiver unit 24 (which comprises a receiver and a transmitter) with associated antenna(s) 26 which are used to transmit signals to and receive signals from a base station 12 in the network 10. The UE 20 also comprises a memory or memory unit 28 that is connected to the processing unit 22 and that contains instructions or computer code executable by the processing unit 22 and other information or data required for the operation of the UE 20.

Figure 3:
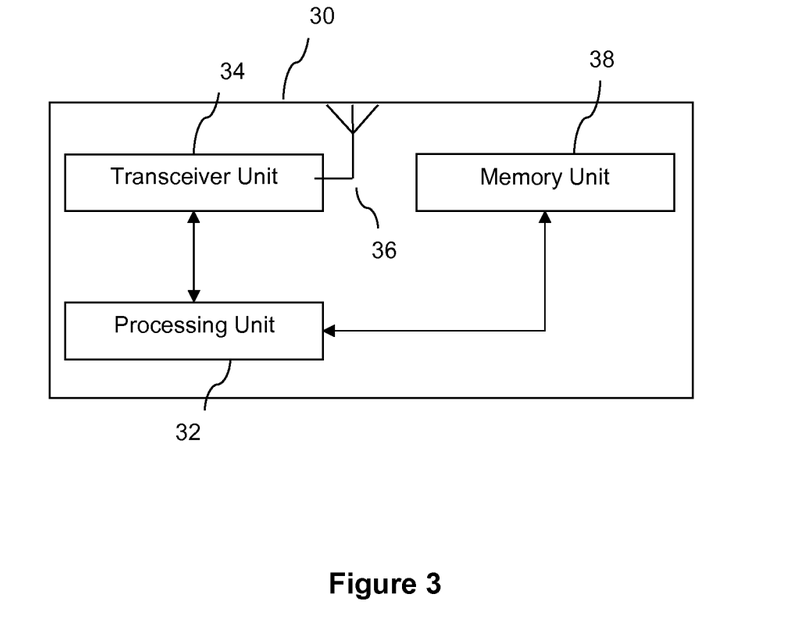
FIG. 3 illustrates a network node in the network of FIG. 1.

FIG. 3 shows a Serving GPRS Support Node (SGSN) 30 that can be adapted or configured to operate according to one or more of the non-limiting example embodiments described. The SGSN 30 comprises a processor or processing unit 32 that controls the operation of the SGSN 30. The processing unit 32 is connected to a transceiver unit 34 (which comprises a receiver and a transmitter) with associated antenna(s) 36 which are used to transmit signals to and receive signals from terminal device(s) 20, via basestations 12 in the network 10. The SGSN 30 also comprises a memory or memory unit 38 that is connected to the processing unit 32 and that contains instructions or computer code executable by the processing unit 32 and other information or data required for the operation of the SGSN 30.

Encryption of control signaling and user plane data is optional in 2G GPRS. Existing 2G GPRS has several security issues that are more problematic in Cellular Internet of Things (CIoT) context than in normal GSM/GPRS context. For example, there is a problem of a "bidding down" attack which could potentially allow an attacker to turn off the encryption. This may lead to a problem of the loss of confidentiality but also more severe problems of allowing an attacker to detach the CIoT UE from the network, and in this way leaving the CIoT UE without network connection. The CIoT UE would need to recover from such situation without human assistance. There is also a risk that the CIoT UE may be tricked to perform a Denial of Service attack towards the network if security enhancements are not specified. Furthermore, the attacker could potentially force the CIoT UE and the network run authentication more frequently than absolutely necessary and in this way consume the battery of the CIoT UE. Some CIoT UEs are assumed to operate with a very small and low-capacity battery for ten years.

A solution to solve the attacks described above is to introduce integrity protection. The security feature of integrity protection was never standardized in 2G GPRS.

Integrity protection could be supported by the LLC layer in order to be able to integrity protect layer 3 control signaling messages such as for example GMM messages, SM messages, Short Message Service (SMS), and user plane data.

In order to provide integrity protection, the CIoT UE and SGSN need to negotiate which integrity algorithm and encryption algorithm to use for security protection of layer 3 signaling information and user plane data when the CIoT UE initiates GMM Attach procedure in order to register in the 3GPP network. The CIoT UE therefore needs to send the identifiers of the supported integrity protection algorithms together with the supported encryption algorithms to the SGSN in its security capability indication (CIoT UE's security capabilities), when it attaches to the network and initiates a GMM Attach Request message. The CIoT UE's security capabilities could be indicated for example in 'MS network capability' or in a new UE capability indication, However, currently the GMM Attach Request message cannot be protected between the CIoT UE and the SGSN, as the SGSN has not yet been able to authenticate the CIoT UE and establish any common security keys in the SGSN and CIoT UE. It is therefore not possible for the SGSN to detect whether there has been an attack on the supported security algorithm identifiers indicated in the CIoT UE's security capability included in the GMM Attach Request message by the CIoT UE.

Therefore it is now proposed that the SGSN should echo the CIoT UE's security capabilities received in GMM Attach Request message, back to the CIoT UE in an integrity protected GMM message (e.g. GMM Authentication and Ciphering Request message or any new GMM message), so that the CIoT UE is able to check if the received CIoT UE's security capabilities matches with the CIoT UE's security capability it sent in GMM Attach Request message to the SGSN, in order to conclude that no bidding down attack has taken place.

The SGSN also selects a common encryption algorithm and a common integrity protection algorithm based on the support algorithms indicated in CIoT UE's security capabilities from CIoT UE in GMM Attach Request message. Therefore the SGSN can indicate the selected algorithms in an integrity protected GMM message (e.g. GMM Authentication and Ciphering Request message or any new GMM message) to the CIoT UE.

However, currently the CIoT UE does not have the integrity key and the network selected integrity algorithm available in the LLC layer when the CIoT UE receives the GMM message from the SGSN including the echoed CIoT UE's security capabilities and the selected encryption and integrity protection algorithms (e.g. in GMM Authentication and Ciphering Request message or any new GMM message). This implies that the LLC layer in the CIoT UE is not able to verify any Message Authentication Code (MAC) provided in the LLC protocol.

Figure 4:
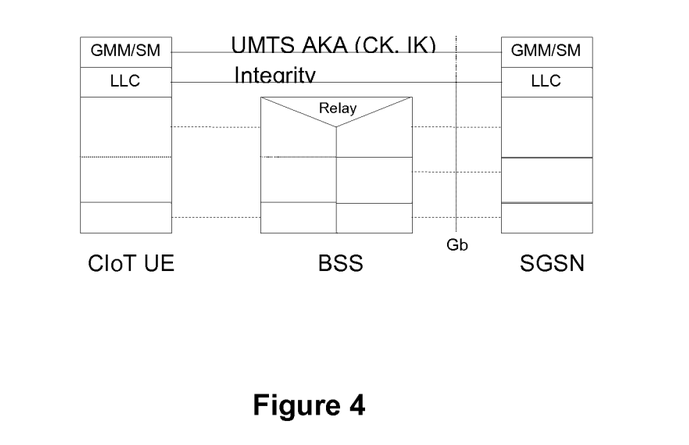
FIG. 4 illustrates protocols in use in the network of FIG. 1.

FIG. 4 illustrates a protocol layer control plane in Gb mode.

As can be seen from this figure, the the Universal Mobile Telecommunications System (UMTS) Authentication and Key Agreement (AKA) is run at the GPRS Mobility Management and Session Management (GMM/SM) layer creating the keying material (CK, IK). The integrity protection is done at the Logical Link Control (LLC) layer using the integrity key (IK') created with the key derivation function from the UMTS AKA session keys.

Figure 5:
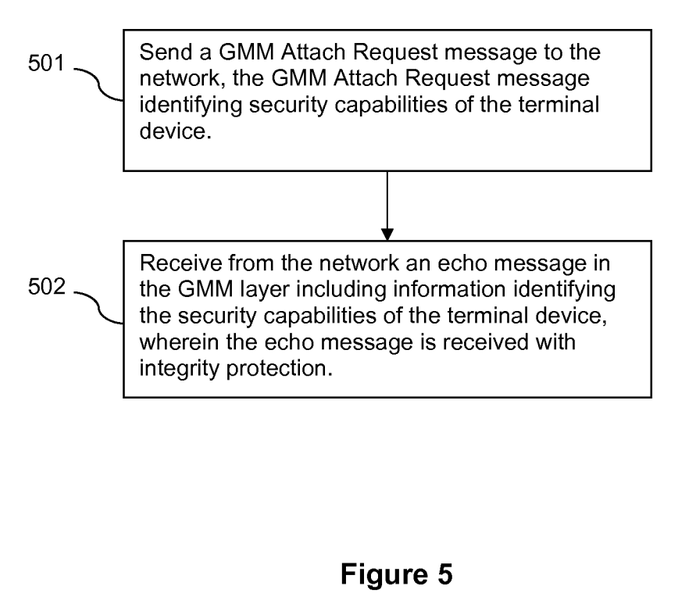
FIG. 5 is a flow chart illustrating a method.

FIG. 5 is a flow chart showing a method of operation of a terminal device in a cellular communications network according to an embodiment.

In step 501 the terminal device sends a GMM Attach Request message to the network, the GMM Attach Request message identifying security capabilities of the terminal device.

In step 502 the terminal device receives from the network an echo message in the GMM layer including information identifying the security capabilities of the terminal device, wherein the echo message is received with integrity protection.

The method of operation of the terminal device may further comprise any of the following features.

The integrity protection may be provided by a Message Authentication Code in the echo message.

The echo message may be a GMM Authentication and Ciphering Response message.

The security capabilities identified in the GMM Attach Request message may include at least one of: an integrity protection algorithm supported by the terminal device; and an encryption algorithm supported by the terminal device.

The echo message may further include information identifying at least one of: an integrity protection algorithm selected by the network and supported by the terminal device; and an encryption algorithm selected by the network and supported by the terminal device.

The method may comprise verifying a Message Authentication Code included in the echo message.

The method may comprise verifying the Message Authentication Code in the GMM protocol layer in the terminal device.

The method may comprise verifying the Message Authentication Code in the terminal device using a counter value. The counter value may include bits of a RAND value.

If the Message Authentication Code is verified, then the method may comprise determining whether the security capabilities of the terminal device identified in the echo message match the security capabilities of the terminal device identified in the GMM Attach Request message; and maintaining the connection with the network only if the security capabilities of the terminal device identified in the echo message do match the security capabilities of the terminal device identified in the GMM Attach Request message.

If the security capabilities of the terminal device identified in the echo message do match the security capabilities of the terminal device identified in the GMM Attach Request message, then the method may comprise deriving at least one security key; and activating integrity protection in a LLC protocol layer by assigning the derived security key to the LLC protocol layer.

The method may comprise activating integrity protection in the LLC protocol layer after sending to the network a response indicating successful authentication with the network.

The method may comprise activating integrity protection in the LLC protocol layer before sending to the network a response indicating successful authentication with the network. The response indicating successful authentication with the network may be a GMM message.

The response indicating successful authentication with the network may be GMM Authentication and Ciphering Response message.

The security key used for integrity protection in the LLC protocol layer may be the same as the key used for integrity protection in the GMM layer.

The security key used for integrity protection in the LLC protocol layer may be different from the key used for integrity protection in the GMM layer.

The security key used in the LLC protocol layer for integrity protection of user plane data may be the same as the key used for integrity protection of layer 3 signalling.

The security key used in the LLC protocol layer for integrity protection of user plane data may be different from the key used for integrity protection of layer 3 signalling.

The method may comprise hashing an integrity key for protection of user plane data, $Kti\text{-}llc\text{-}up\text{-}_{128}$, from the key—$Kti_{128}$, using a static string as follows:

$Kti\text{-}llc\text{-}up\text{-}_{128} = KDF$ ("int-llc-up", $Kti_{128}$); and hashing a different integrity key for protection of layer 3 signaling messages, $Kti\text{-}llc\text{-}cp\text{-}_{128}$, from the key—$Kti_{128}$, using a static string as follows:

$Kti\text{-}llc\text{-}cp\text{-}_{128} = KDF$ ("int-llc-cp", $Kti_{128}$).

Figure 6:
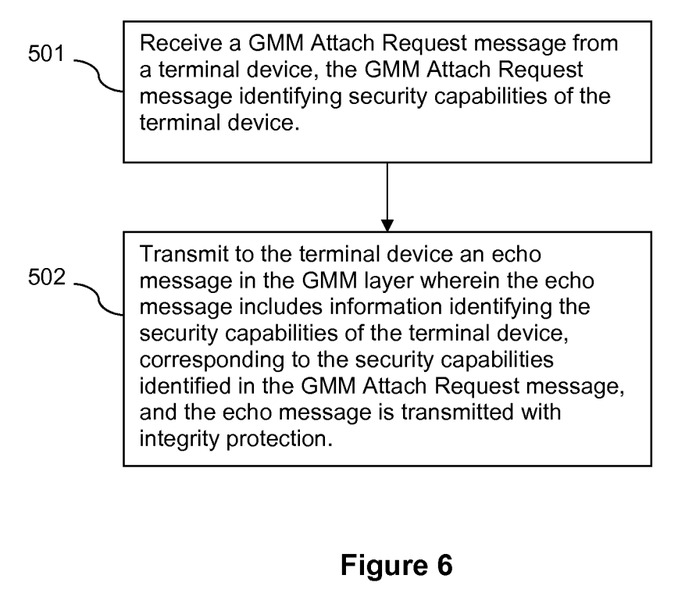
FIG. 6 is a flow chart illustrating a method.

FIG. 6 is a flow chart showing a method of operation of a network node in a cellular communications network according to embodiments.

In step 601 the network node receives a GMM Attach Request message from a terminal device, the GMM Attach Request message identifying security capabilities of the terminal device.

In step 602 the network node transmits to the terminal device an echo message in the GMM layer wherein the echo message includes information identifying the security capabilities of the terminal device, corresponding to the security capabilities identified in the GMM Attach Request message, and the echo message is transmitted with integrity protection.

The method of operation of the network node may further comprise any of the following features.

The integrity protection may be provided by a Message Authentication Code in the echo message.

The echo message may be a GMM Authentication and Ciphering Response message.

The security capabilities identified in the GMM Attach Request message may include at least one of: an integrity protection algorithm supported by the terminal device; and an encryption algorithm supported by the terminal device.

The echo message may further include information identifying at least one of: an integrity protection algorithm selected by the network and supported by the terminal device; and an encryption algorithm selected by the network and supported by the terminal device.

The method may comprise activating integrity protection in the LLC protocol layer after receiving from the terminal device a response indicating successful authentication with the network.

The method may comprise activating integrity protection in the LLC protocol layer after receiving from the terminal device a response indicating successful authentication with the network.

The response indicating successful authentication with the network may be a GMM message.

The response indicating successful authentication with the network may be a GMM Authentication and Ciphering Response message.

The security key used for integrity protection in the LLC protocol layer may be the same as the key used for integrity protection in the GMM layer.

The security key used for integrity protection in the LLC protocol layer may be different from the key used for integrity protection in the GMM layer.

The security key used in the LLC protocol layer for integrity protection of user plane data may be the same as the key used for integrity protection of layer 3 signalling.

The security key used in the LLC protocol layer for integrity protection of user plane data may be different from the key used for integrity protection of layer 3 signalling.

The method may further comprise hashing an integrity key for protection of user plane data, $Kti\text{-}llc\text{-}up\text{-}_{128}$, from the key—$Kti_{128}$, using a static string as follows:

$Kti\text{-}llc\text{-}up\text{-}_{128} = KDF$ ("int-llc-up", $Kti_{128}$); and hashing a different integrity key for protection of layer 3 signaling messages, $Kti\text{-}llc\text{-}cp\text{-}_{128}$, from the key—$Kti_{128}$, using a static string as follows:

$Kti\text{-}llc\text{-}cp\text{-}_{128} = KDF$ ("int-llc-cp", $Kti_{128}$).

Referring again to the CIoT UE and the SGSN, it should be the responsibility of the GMM layer to start or activate integrity protection in the LLC layer. This applies to both CIoT UE and SGSN. The GMM layer in the CIoT UE may start or activate integrity protection in the LLC layer when a successful run of UMTS AKA on the USIM has taken place. A new indication from the GMM layer to the LLC layer may be defined to handle this. This indication is internal to the CIoT UE and SGSN. This can apply to both the CIoT UE and the SGSN.

The new indication from the GMM layer to the LLC layer may include the integrity key Kti or a key derived from Kti and the selected integrity algorithm. This can apply to both the CIoT UE and the SGSN.

If the CIoT UE can verify that there has been no attack on the echoed CIoT UE's security capabilities sent in GMM Attach Request, then the GMM layer in the CIoT UE activates integrity protection in the LLC layer by assigning the integrity key Kti or a key derived from Kti and the integrity algorithm to the LLC layer.

Activating integrity protection in the LLC layer in the CIoT UE and SGSN can take place either: before the CIoT UE has sent off the successful response in GMM layer to the SGSN (for example in GMM Authentication and Ciphering Response message), the GMM layer in the CIoT UE activates integrity protection in the LLC layer by assigning the integrity key Kti or a key derived from Kti and the integrity algorithm to the LLC layer. After the SGSN has sent off the GMM message containing the RAND and AUTN to the CIoT UE (in for example GMM Authentication and Ciphering Request message), the GMM layer in the SGSN activates integrity protection in the LLC layer by assigning the integrity key Kti or a key derived from Kti and the integrity algorithm to the LLC layer; or after the CIoT UE has sent off the successful response in GMM layer to the SGSN, (for example in GMM Authentication and Ciphering Response), the GMM layer in the CIoT UE activates integrity protection in the LLC layer by assigning the integrity key Kti or a key derived from Kti and the integrity algorithm to the LLC layer. When the SGSN has received the response from the CIoT UE (for example in GMM Authentication and Ciphering Response including the RES) and concluded that the SGSN and CIoT UE has successfully established common security keys, then the GMM layer in the SGSN activates integrity protection in the LLC layer by assigning the integrity key Kti or a key derived from Kti and the integrity algorithm to the LLC layer.

Figure 7:
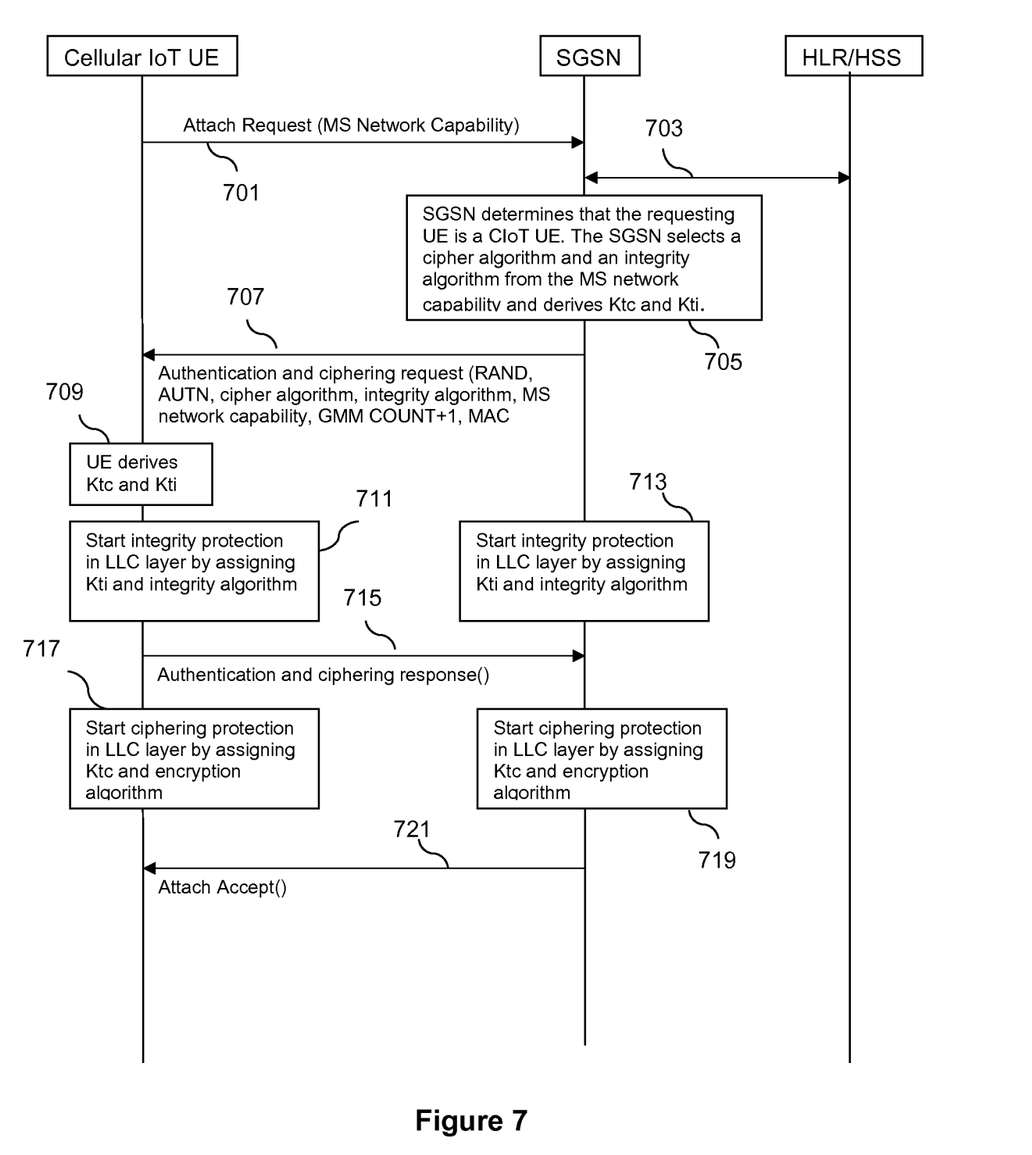
FIG. 7 is a signalling diagram.

FIG. 7 is a signalling diagram illustrating a method according to some embodiments. In this embodiment, integrity protection is activated in LLC layer before CIoT UE has sent GMM Authentication and Ciphering Response message. Integrity protection is activated in LLC layer after SGSN has sent GMM Authentication and Ciphering Request message to CIoT UE In step 701 the CIoT UE sends an Attach Request to the SGSN. The security capabilities of the UE, such as the cipher algorithms and integrity algorithms supported by the Cellular IoT UE, may be included in the MS network capability parameters sent along with this request.

In step 703 the SGSN obtains authentication information (AVs quintets) from the Home Location Register (HLR)/Home Subscriber Server (HSS) based on the International Mobile Subscriber Identity (IMSI).

In step 705 the SGSN determines that the requesting UE is a CIoT UE based on the received MS network capability parameters. The SGSN may then select a cipher algorithm and an integrity algorithm from the security capabilities of the UE sent as part of the MS network capability. The SGSN derives a cipher key (Ktc) and an integrity key (Kti). Ktc and Kti may be 128 bits in length.

In step 707 the SGSN sends a GMM message, such an Authentication and Ciphering Request including the chosen cipher algorithm and integrity algorithm along with the echoed MS network capability to Cellular IoT UE. The Authentication and Ciphering Request message is integrity protected by a Message Authentication Code (MAC) which is calculated over the Authentication and Ciphering Request message by the GMM layer in the network. I.e. the Authentication and Ciphering Request message is integrity protected at GMM layer. In some embodiments the GMM layer utilizes the integrity key Kti or a key derived from Kti and a counter value to calculate the MAC. The term Message Authentication Code (MAC) is used herein to refer to any piece of information that can be used to authenticate a message, such as the result of a keyed hash function. The term Message Integrity Code (MIC) is also used with the same meaning.

In step 709 the Cellular IoT UE runs UMTS AKA with a USIM and derives the keys Ktc and Kti from the received keys CK and IK. The GMM layer in the Cellular IoT UE verifies the MAC by utilizing the Kti or a key derived from Kti and the counter value.

If the check of the MAC is successful, then the Cellular IoT UE checks the echoed MS network capability. The CIoT UE may then verify that there has been no attack on MS network capability originally sent by the Cellular IoT UE in GMM Attach Request.

In step 711 the GMM layer in the CIoT UE activates integrity protection in the LLC layer by assigning the integrity key Kti or a key derived from Kti and the selected integrity algorithm to the LLC layer.

In step 713 the GMM layer in the SGSN activates integrity protection in the LLC layer by assigning the integrity key Kti or a key derived from Kti and the selected integrity algorithm to the LLC layer.

In step 715 the CIoT UE sends an authentication and ciphering response to SGSN including the RES. This message is integrity protected on LLC layer.

In step 717 the GMM layer in the CIoT UE activates ciphering in the LLC layer by assigning the ciphering key Ktc or a key derived from Ktc and the selected ciphering algorithm to the LLC layer.

In step 719, the GMM layer in the SGSN checks the RES received in authentication and ciphering response message. If the check is successful, then the GMM layer in the SGSN activates ciphering in the LLC layer by assigning the ciphering key Ktc or a key derived from Ktc and the selected ciphering algorithm to the LLC layer.

Any communication between Cellular IoT UE and SGSN can now be confidentiality protected and integrity protected by using Ktc (or a key derived from Ktc) and Kti (or a key derived from Kti). In step 721, the SGSN sends Attach Accept message to the CIoT UE.

Figure 8:
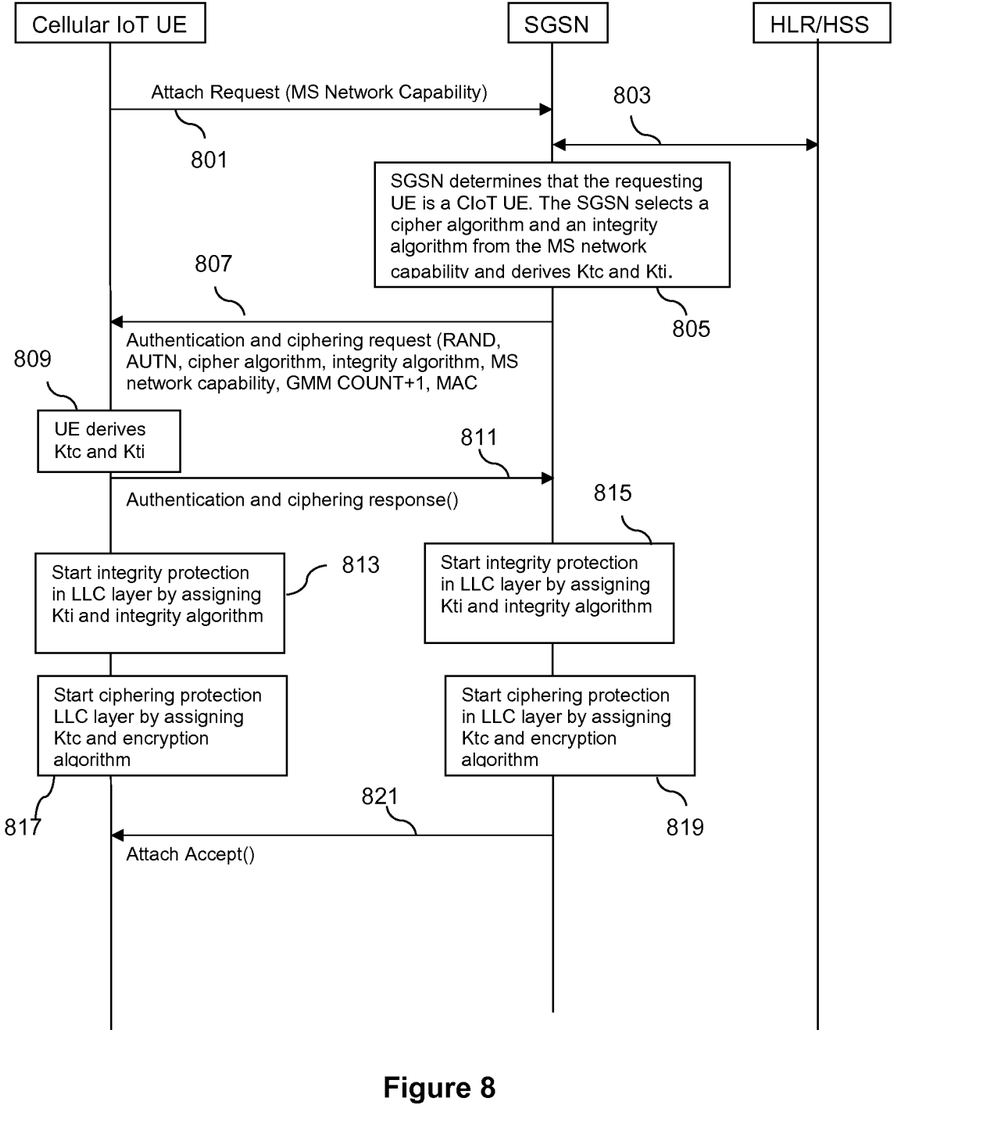
FIG. 8 is a signalling diagram.

FIG. 8 is a signalling diagram illustrating a method according to some embodiments. In this embodiment, integrity protection is activated in LLC layer after CIoT UE has sent GMM Authentication and Ciphering Response message to SGSN.

In step 801 the CIoT UE sends an Attach Request to the SGSN. The security capabilities of the UE, such as the cipher algorithms and integrity algorithms supported by the Cellular IoT UE, may be included in the MS network capability parameters sent along with this request.

In step 803 the SGSN obtains authentication information (AVs quintets) from the Home Location Register (HLR)/Home Subscriber Server (HSS) based on the International Mobile Subscriber Identity (IMSI).

In step 805 the SGSN determines that the requesting UE is a CIoT UE based on the received MS network capability parameters. The SGSN may then select a cipher algorithm and an integrity algorithm from the security capabilities of the UE sent as part of the MS network capability. The SGSN derives a cipher key (Ktc) and an integrity key (Kti). Ktc and Kti may be 128 bits in length.

In step 807 the SGSN sends a GMM message, such as an Authentication and Ciphering Request including the chosen cipher algorithm and integrity algorithm along with the echoed MS network capability to Cellular IoT UE. The Authentication and Ciphering Request message is integrity protected by a Message Authentication Code (MAC) which is calculated over the Authentication and Ciphering Request message by the GMM layer in the network. I.e. the Authentication and Ciphering Request message is integrity protected at GMM layer. In some embodiments the GMM layer utilizes the integrity key Kti or a key derived from Kti and a counter value to calculate the MAC.

In step 809 the Cellular IoT UE runs UMTS AKA with a USIM and derives the keys Ktc and Kti from the received keys CK and IK. The GMM layer in the Cellular IoT UE verifies the MAC by utilizing the Kti or a key derived from Kti and the counter value.

If the check of the MAC is successful, then the Cellular IoT UE checks the echoed MS network capability. The CIoT UE may then verify that there has been no attack on MS network capability originally sent by the Cellular IoT UE in GMM Attach Request In step 811, if the Cellular IoT UE successfully verifies that there has been no attack on MS network capability, then the Cellular IoT UE sends Authentication and Ciphering Response message including the RES to the SGSN.

In step 813, the GMM layer in the CIoT UE activates integrity protection in the LLC layer by assigning the integrity key Kti or a key derived from Kti and the selected integrity algorithm to the LLC layer.

In step 815, the GMM layer in the SGSN checks the RES received in authentication and ciphering response message. If the check is successful, then the GMM layer in the SGSN activates integrity protection in the LLC layer by assigning the integrity key Kti or a key derived from Kti and the selected integrity algorithm to the LLC layer.

In step 817, the GMM layer in the CIoT UE activates ciphering in the LLC layer by assigning the ciphering key Ktc or a key derived from Ktc and the selected ciphering algorithm to the LLC layer.

In step 819, the GMM layer in the SGSN activates ciphering in the LLC layer by assigning the ciphering key Ktc or a key derived from Ktc and the selected ciphering algorithm to the LLC layer.

The communication between Cellular IoT UE and SGSN can now be confidentiality protected and integrity protected by using Ktc (or a key derived from Ktc) and Kti (or a key derived from Kti). In step 821, the SGSN sends Attach Accept message to the CIoT UE.

The counter value used in the methods described in FIGS. 7 and 8 may be implemented in a number of different ways. For example, the GMM layer in the SGSN may have, for example a 32 bits counter or a counter of any other length, as input to the integrity protection algorithm when it calculates the MAC or MIC. In some embodiments, only one downlink counter would be needed at GMM layer and it should be available in both the SGSN and CIoT UE.

If a new downlink counter is defined at the GMM layer, a GMM COUNT, then this counter may be reset to zero and increased by one in the GMM layer in the SGSN whenever a new UMTS AKA takes place and is run with the CIoT UE.

The GMM COUNT value may be included together with the MAC or MIC in the GMM message containing the echoed CIoT UE's security capabilities from the SGSN to the CIoT UE. The value GMM COUNT value may also be used as an input to the integrity verification algorithm when verifying the MAC or MIC.

After successful integrity protection validation, the CIoT UE may update its corresponding locally stored counter by overwriting the old locally stored counter with the received GMM COUNT value.

If the GMM message containing the echoed CIoT UE's security capabilities is used to switch algorithm(s) only without a new AKA taking place, then this GMM COUNT could be increased by one by the SGSN. The increased GMM COUNT needs to be included by the SGSN to the CIoT in the GMM message containing the echoed CIoT UE's security capabilities.

Alternatively, the GMM layer in the SGSN may copy some of the bits from the RAND value (for example 32 bits if a 32-bit counter is used) and use these bits as a counter whenever a new AKA takes place and is run with the CIoT UE.

This counter could be included as a separate parameter together with the MAC or MIC in the GMM message containing the echoed CIoT UE's security capabilities to the CIoT UE.

The GMM layer in the CIoT UE should take the same corresponding bits from the received RAND when a new AKA is initiated by the SGSN and use these as a counter and as an input to the integrity verification algorithm. After a successful integrity protection validation, the CIoT UE may then update its corresponding locally stored counter by overwriting the old locally stored counter.

If the GMM message containing the echoed CIoT UE's security capabilities is used only to switch algorithm(s) without a new AKA taking place, then this counter (copied from RAND bits) could be increased by one. The counter would need to be included into the GMM message containing the echoed CIoT UE's security capabilities.

The CIoT UE should take the counter received in the GMM message containing the echoed CIoT UE's security capabilities and compare it with the locally stored counter. If the received counter is less than or equal to the corresponding locally stored counter then the CIoT may silently discard the GMM message as it may be considered as a replayed GMM message.

If the received counter is larger than the corresponding locally stored counter, then the CIoT UE may use the received counter as input to the integrity verification algorithm. After successful integrity protection validation, the CIoT UE may update its corresponding locally stored counter by overwriting the old locally stored counter with the received counter.

A further alternative may be to copy some defined number of bits from the RAND value (for example 32 bits if a 32 bit counter is to be used) and hash these bits to provide a hashed value which may then be used as a counter in the SGSN and CIoT UE in the GMM layer.

The GMM layer in the SGSN may need an integrity key as an input into the integrity protection algorithm when it calculates the MAC or MIC.

There are different options to consider for providing this integrity key.

Firstly, the integrity key in the GMM layer may be the same key used for integrity protection in the LLC layer. Alternatively, different integrity keys could be used for integrity protection in the GMM layer and in the LLC layer.

If it is decided that different integrity keys are to be used for integrity protection in the GMM layer and in the LLC layer, then one option is to hash a new integrity key for use in the GMM layer, Kti-gmm-$_{128}$, from the key—Kti$_{128}$, using a static string as follows:

Kti-gmm-128=KDF ("int-gmm", Kti$_{128}$);

and hash a different integrity key for use in the LLC layer, Kti-llc-$_{128}$, from the key—Kti$_{128}$, using a static string as follows:

Kti-llc-$_{128}$=KDF ("int-llc", Kti$_{128}$), where Kti$_{128}$ is defined in the 3GPP standards (TR 33.860).

The LLC layer in the SGSN and in the CIoT UE may need an integrity key as an input into the integrity protection algorithm when it calculates the MAC or MIC.

There are different options to consider for providing this integrity key.

Firstly, the integrity key in the LLC layer may be the same key used for integrity protection of layer 3 signalling messages and user plane data. Alternatively, different integrity keys could be used for integrity protection of layer 3 signalling messages and user plane data.

If it is decided that different integrity keys are to be used for integrity protection of layer 3 signalling messages and user plane data, then one option is to hash a new integrity key for protection of user plane data, Kti-llc-up-$_{128}$, from the key—Kti$_{128}$, using a static string as follows:

Kti-llc-up-$_{128}$=KDF ("int-llc-up", Kti$_{128}$);

and to hash a different integrity key for protection of layer 3 signalling messages, Kti-llc-cp-$_{128}$, from the key—Kti$_{128}$, using a static string as follows:

Kti-llc-cp-$_{128}$=KDF ("int-llc-cp", Kti$_{128}$), where Kti$_{128}$ is defined in the 3GPP standards (TR 33.860).

In legacy LLC layer the same encryption key is used for encryption of layer 3 signalling messages and user plane data.

Different encryption keys could be used in LLC layer for encryption of layer 3 signalling messages and user plane data.

One option is to hash a new encryption key for protection of user plane data, Ktc-enc-llc-up-$_{128}$, from the key—Ktc$_{128}$, using a static string as follows:

Ktc-enc-llc-up-$_{128}$=KDF ("enc-llc-up", Ktc$_{128}$);

and to hash a different encryption key for protection of layer 3 signalling messages, Kti-enc-llc-cp-$_{128}$, from the key—Ktc$_{128}$, using a static string as follows:

Ktc-enc-llc-cp-$_{128}$=KDF ("enc-llc-cp", Ktc$_{128}$), where Kti$_{128}$ is defined in the 3GPP standards (TR 33.860).

Figure 9:
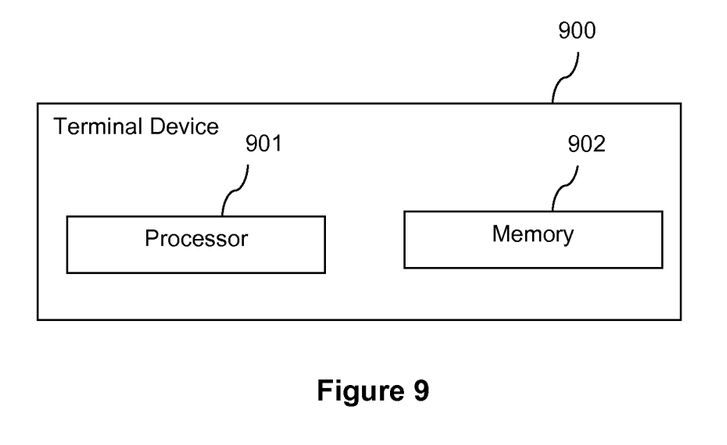
FIG. 9 illustrates a terminal device in the network of FIG. 1.

FIG. 9 illustrates a terminal device according to embodiments.

The terminal device 900 comprises a processor 901 and a memory 902, said memory 902 containing instructions executable by said processor 901, whereby said terminal device is operative to: send a GMM Attach Request message to the network, the GMM Attach Request message identifying security capabilities of the terminal device, and receive from the network an echo message in the GMM layer including information identifying the security capabilities of the terminal device, wherein the echo message is received with integrity protection.

Figure 10:
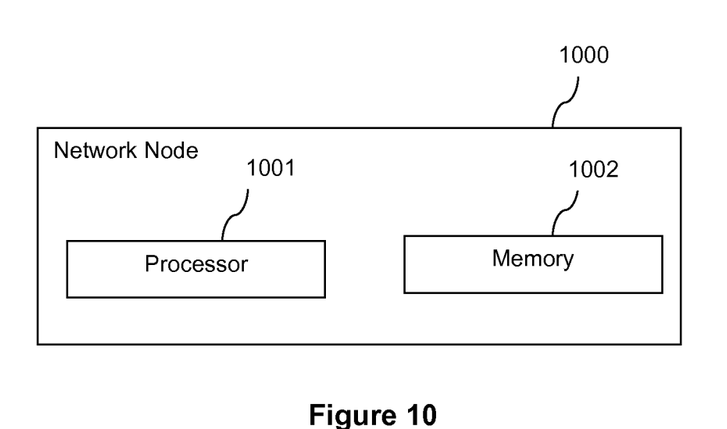
FIG. 10 illustrates a network node in the network of FIG. 1.

FIG. 10 illustrates a network node 1000 according to embodiments.

The network node 1000 comprises a processor 1001 and a memory 1002, said memory 1002 containing instructions executable by said processor 1001, whereby said network node 1000 is operative to: receive a GMM Attach Request message from a terminal device, the GMM Attach Request message identifying security capabilities of the terminal device; and transmit to the terminal device an echo message in the GMM layer, wherein the echo message includes information identifying the security capabilities of the terminal device, corresponding to the security capabilities identified in the GMM Attach Request message, and further transmit the echo message with integrity protection.

The network node may further be operable to perform any of the optional method steps described with reference to FIG. 6.

Figure 11:
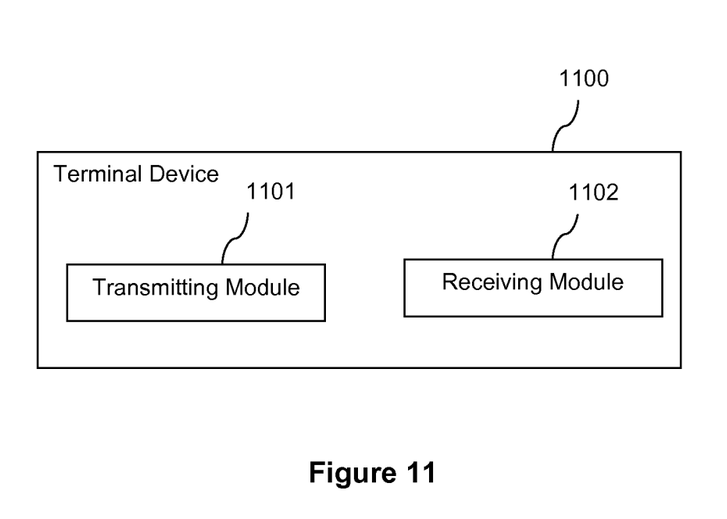
FIG. 11 illustrates a terminal device in the network of FIG. 1.

FIG. 11 illustrates a terminal device according to embodiments.

The terminal device 1100 comprises a transmitting module 1101 for sending a GMM Attach Request message to the network, the GMM Attach Request message identifying security capabilities of the terminal device, and a receiving module 1103 for receiving from the network an echo message in the GMM layer including information identifying the security capabilities of the terminal device, wherein the echo message is received with integrity protection.

The terminal device may further be operable to perform any of the optional method steps described with reference to FIG. 5.

Figure 12:
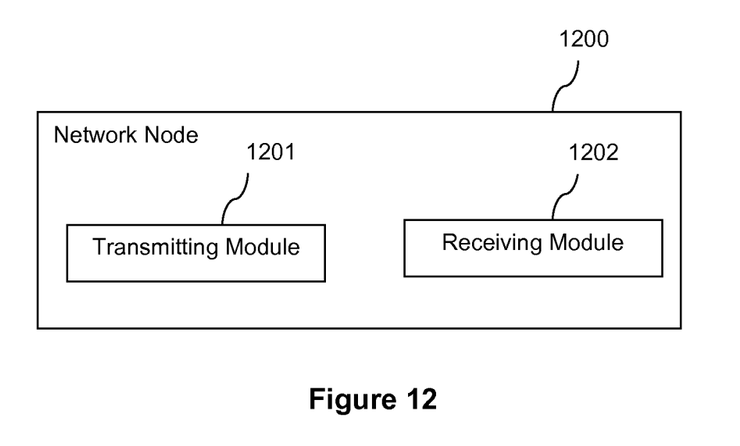
FIG. 12 illustrates a network node in the network of FIG. 1.

FIG. 12 illustrates a network node 1200 according to embodiments.

The network node 1200 comprises a receiving module for receiving a GMM Attach Request message from a terminal device, the GMM Attach Request message identifying security capabilities of the terminal device; and transmitting module for transmitting to the terminal device an echo message in the GMM layer, wherein the echo message includes information identifying the security capabilities of the terminal device, corresponding to the security capabilities identified in the GMM Attach Request message, and further transmitting the echo message with integrity protection.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a terminal device in a cellular communications network, the method comprising:
   sending a General Packet Radio Service (GPRS) Mobility Management Attach Request message to the network, the GPRS Mobility Management (GMM) Attach Request message identifying security capabilities of the terminal device; and
   receiving from the network an echo message in a GMM layer including information identifying the security capabilities of the terminal device, wherein the echo message is received with integrity protection.

2. The method of claim 1, wherein the integrity protection is provided by a Message Authentication Code in the echo message.

3. The method of claim 1, wherein the echo message is a GMM Authentication and Ciphering Request message.

4. The method of claim 1, wherein the security capabilities identified in the GMM Attach Request message include at least one of: an integrity protection algorithm supported by the terminal device or an encryption algorithm supported by the terminal device.

5. The method of claim 4, wherein the echo message further includes information identifying at least one of: an integrity protection algorithm selected by the network and supported by the terminal device or an encryption algorithm selected by the network and supported by the terminal device.

6. The method of claim 1, further comprising:
   verifying a Message Authentication Code included in the echo message.

7. The method of claim 6, further comprising verifying the Message Authentication Code in the GMM protocol layer in the terminal device.

8. The method of claim 6, further comprising verifying the Message Authentication Code in the terminal device using a counter value.

9. The method of claim 8, wherein the counter value includes bits of a random number (RAND) value.

10. The method of claim 6, further comprising, if the Message Authentication Code is verified:
   determining whether the security capabilities of the terminal device identified in the echo message match the security capabilities of the terminal device identified in the GMM Attach Request message; and
   maintaining the connection with the network only if the security capabilities of the terminal device identified in the echo message do match the security capabilities of the terminal device identified in the GMM Attach Request message.

11. The method of claim 10, further comprising, if the security capabilities of the terminal device identified in the echo message do match the security capabilities of the terminal device identified in the GMM Attach Request message:
   deriving at least one security key; and
   activating integrity protection in a Logical Link Control (LLC) protocol layer by assigning the derived security key to the LLC protocol layer.

12. A terminal device for use in a cellular communications network, the terminal device being configured to:
   send a General Packet Radio Service (GPRS) Mobility Management Attach Request message to the network, the GPRS Mobility Management (GMM) Attach Request message identifying security capabilities of the terminal device; and
   receive from the network an echo message in a GMM layer including information identifying the security capabilities of the terminal device, wherein the echo message is received with integrity protection.

13. A method of operation of a network node in a cellular communications network, the method comprising:
   receiving a General Packet Radio Service (GPRS) Mobility Management Attach Request message from a terminal device, the GPRS Mobility Management (GMM) Attach Request message identifying security capabilities of the terminal device; and
   transmitting to the terminal device an echo message in a GMM layer,
   wherein the echo message includes information identifying the security capabilities of the terminal device, corresponding to the security capabilities identified in the GMM Attach Request message, and
   the method further comprises transmitting the echo message with integrity protection.

14. The method of claim 13, wherein the integrity protection is provided by a Message Authentication Code in the echo message.

15. The method of claim 13, wherein the echo message is a GMM Authentication and Ciphering Request message.

16. The method of claim 13, wherein the security capabilities identified in the GMM Attach Request message include at least one of: an integrity protection algorithm supported by the terminal device or an encryption algorithm supported by the terminal device.

17. The method of claim 16, wherein the echo message further includes information identifying at least one of: an integrity protection algorithm selected by the network and supported by the terminal device or an encryption algorithm selected by the network and supported by the terminal device.

18. The method of claim 13, further comprising activating integrity protection in a Logical Link Control (LLC) protocol layer after receiving from the terminal device a response indicating successful authentication with the network.

19. The method of claim 18, wherein the response indicating successful authentication with the network is a GMM message.

20. The method of claim 19, wherein the response indicating successful authentication with the network is a GMM Authentication and Ciphering Response message.

21. The method of claim 18, wherein the security key used for integrity protection in the LLC protocol layer is the same as the key used for integrity protection in the GMM layer.

22. The method of claim 18, wherein the security key used for integrity protection in the LLC protocol layer is different from the key used for integrity protection in the GMM layer.

23. A network node for use in a cellular communications network, being configured to:
   receive a General Packet Radio Service (GPRS) Mobility Management Attach Request message from a terminal device, the GPRS Mobility Management (GMM) Attach Request message identifying security capabilities of the terminal device;
   transmit to the terminal device an echo message in a GMM layer, wherein the echo message includes information identifying the security capabilities of the terminal device, corresponding to the security capabilities identified in the GMM Attach Request message; and
   transmit the echo message with integrity protection.

24. The network node of claim 23, wherein the network node is further configured to activate integrity protection in a Logical Link Control (LLC) protocol layer after receiving from the terminal device a response indicating successful authentication with the network.

* * * * *

UNITED STATES PATENT AND TRADEMARK OFFICE
CERTIFICATE OF CORRECTION

PATENT NO. : 10,555,177 B2  
APPLICATION NO. : 15/765839  
DATED : February 4, 2020  
INVENTOR(S) : Wifvesson et al.

Page 1 of 1

It is certified that error appears in the above-identified patent and that said Letters Patent is hereby corrected as shown below:

In the Specification

In Column 2, Lines 61-62, delete "claim 1-20 or 41-54" and insert -- claims 1-20 or 41-54. --, therefor.

In Column 4, Line 36, delete "basestation 12" and insert -- base station 12 --, therefor.

In Column 4, Line 39, delete "basestations," and insert -- base stations, --, therefor.

In Column 4, Line 67, delete "basestations" and insert -- base stations --, therefor.

In Column 6, Line 18, delete "the the" and insert -- the --, therefor.

In Column 9, Line 26, delete "UE" and insert -- UE. --, therefor.

In Column 11, Line 5, delete "Request" and insert -- Request. --, therefor.

Signed and Sealed this  
Fourth Day of August, 2020

Andrei Iancu  
*Director of the United States Patent and Trademark Office*